United States Patent [19]
Dick

[11] Patent Number: 4,831,654
[45] Date of Patent: May 16, 1989

[54] APPARATUS FOR MAKING AND EDITING DICTIONARY ENTRIES IN A TEXT TO SPEECH CONVERSION SYSTEM

[75] Inventor: Colleen R. Dick, Amesbury, Mass.

[73] Assignee: Wang Laboratories, Inc., Lowell, Mass.

[21] Appl. No.: 774,116

[22] Filed: Sep. 9, 1985

[51] Int. Cl.$^4$ .............................................. G10L 5/02
[52] U.S. Cl. ....................................... 381/51; 381/52; 364/513.5
[58] Field of Search ...................... 381/41, 43, 51, 52, 381/53; 364/513, 513.5

[56] References Cited

U.S. PATENT DOCUMENTS

| | | | |
|---|---|---|---|
| 4,685,135 | 8/1987 | Lin et al. ................................ | 381/52 |
| 4,692,941 | 9/1987 | Jacks et al. ............................. | 381/52 |
| 4,694,494 | 9/1987 | Woolfson .............................. | 381/51 |
| 4,695,962 | 9/1987 | Goudie ............................. | 381/51 X |
| 4,696,042 | 9/1987 | Goudie .................................. | 381/51 |

FOREIGN PATENT DOCUMENTS

WO8504747 10/1985 PCT Int'l Appl. .

OTHER PUBLICATIONS

A. Cohen et al., "Considerations for integrating speech I/O Tech" . . . , Wescon Technical Paper, vol. 26, Sep. 1982, pp. 1-8.

J. Gosch, "Voice-synthesizer editor displays speech as curves" . . . , Electronics International, vol. 55, No. 17, Aug. 25, 1982, pp. 68-70, New York.

T. Brightman, Speech-synthesizer software generated from text . . . , Electronic Design, vol. 29, No. 17, Aug. 20, 1981, pp. 107-112.

J. Nance, Implementation strategies for voice-processing terminals Mini-Micro Systems, vol. 16, No. 12, Nov. 1983, pp. 183-194, Denver, Co.

Bernstein, et al., An Intelligent Text to Speech Converter . . . , Compcon '82 Digest of Papers, IEEE New York, U.S., pp. 201-206.

C. Gross, Developpement d'un Vocabulaire de Synthese . . . , Electronique Industrielle, No. 59, Oct. 15, 1983, Paris, France, pp. 65-68.

*Primary Examiner*—Patrick R. Salce
*Assistant Examiner*—Emanuel Todd Voeltz
*Attorney, Agent, or Firm*—Michael H. Shanahan; Gordon E. Nelson

[57] ABSTRACT

Interactive system for manipulating the dictionaries used in text to speech conversion systems. The text to speech conversion system includes a system for converting text to a phonemic representation thereof according to rules and a system for generating speech output which pronounces a text from a phonemic representation of the text. The dictionaries contain phonemic representations of texts which are incorrectly converted by the text to phonemic representation conversion system. The interactive system includes input apparatus for receiving dictionary manipulation commands including a play command from a user of the interactive system and a command execution system for receiving the dictionary manipulation commands and executing them. Included in the command execution system is a play command execution system which executes the play command by providing a phonemic representation involved in a dictionary manipulation to the text to phonemic representation conversion system, thereby providing the user with immediate feedback regarding the correctness of the phonemic representation. Further disclosed are a dictionary scanning system, a dictionary entry generator, and a dictionary entry editor incorporating the invention.

18 Claims, 11 Drawing Sheets

```
01  ? CUSTOM DICTIONARY EDITOR: SELECT WORD        (DAY)    (DATE)   (TIME)
02  |-----------------------------------------------------------------------|
03  EDITING FILE: #:/##########/##########.DIC    1101
04  CURRENT WORD: ###########################################    1103
05  |-----------------------------------------------------------------------|
06  AAA
07  CCCCCCCCCCCCCCCCCCCC
08
09
10                                    1105
11
12
13
14
15
16
17                                                1107
18  YYY
19  ZZZZZZZZZZZZZZZZZZZZZZZZ
20  ? SELECT WORD, PRESS EXECUTE. ?                                  (-MORE-)
    |-----------------------------------------------------------------------|
21  (1) EXECUTE, EDIT    (5) NEXT SCREEN       (9) SEARCH FOR WORD  (13) INSTRUCTIONS
22  (2)                  (6) INSERT NEW WORD   (10)     1109        (14)
23  (3)                  (7)                   (11) PLAY CUR. WORD  (15) PRINT SCREEN
24  (4) PREV SCREEN      (8) DELETE WORD       (12) COMPRESS DIC.   (16) CANCEL, EXIT
25  |-----------------------------------------------------------------------|
```

FIG. 11

```
01  ?CUSTOM DICTIONARY EDITOR: ENTER NEW WORD                    (DAY) (DATE) (TIME)
02
03  EDITING FILE: #:/########/#########:DIC  1101
04
05  NEW WORD: !_____1201_____!
06
07
08
09
10
11
12
13
14
15
16
17
18
19
20  ? ENTER NEW WORD, PRESS EXECUTE. ?      ┌─ 1203        ┌─ 1205
21  |  (1) EXECUTE, EDIT      (5)     |  (9)              (13) INSTRUCTIONS  |
22  |  (2)                    (6)     |  (10) PLAY NEW WORD    (14)          |
23  |  (3)                    (7)     |  (11)              (15) PRINT SCREEN |
24  |  (4)                    (8)     |  (12)              (16) CANCEL, EXIT |
25
```

FIG. 12

```
01 ? CUSTOM DICTIONARY EDITOR: PHONEMIC SPELLING              (DAY) (DATE) (TIME)
02 EDITING FILE:    #:/######/######.DIC  1101
03 CURRENT WORD:   ###################### 1103
04 CURRENT PHONEMIC SPELLING: xx xx xx xx xx xx xx xx xx xx xx xx xx 1301
05 EDITING PHONEMIC SPELLING:  !xx xx xx xx xx xx xx xx xx xx xx xx xx! 1303
06
07                              1307
08  A   ACT      EE BEE      I  BITE    NG SING     OY OIL    UH ALONE   ZH VISION
09  AH  BOX      EH SET      IH BIG     OH BOAT     P  STOP   UW FOOL    #  SNAP
10  AR  ART     ER BUTTER    J  JUST    OL METAL    R  READ   V  LIVE    ?  HE EATS
11  AW  RAW    EY WAY        K  MAKE    OM PRISM    S  SEE    W  AWAY    ?? BUTTON
12  B   BACK   F  FIT        L  LOW     ON BUTTON   SH PUSH   Y  YES
13  CH  BEACH  G  GIVE       LL ALL     OO BOOK     T  TEN    YH ROSES
14  D   BED    H  HIT        M  HIM     OR PORE     TH THIN   YU MUTE
15  DH  THAT   HH BEHIND     N  NOW     OW LOUD     U  UP     Z  LAZY
16  DT  LADDER HW WHITE      I = PRIMARY STRESS     2 = SECONDARY STRESS
17
18
19                                           1309
20 ? EDIT SPELLING, PRESS EXECUTE. ?
21 (1) EXECUTE, ENTER     (5)              (9)       1311    1313    (13) INSTRUCTIONS
22 (2) SHOW PHONEMES     (6) INSERT PHONEME          (10) PLAY PHONEMES  (14)
23 (3)                    (7)                        (11) PLAY CUR. WORD (15) PRINT SCREEN
24 (4                     (8) DELETE PHONEME         (12) ENTER & COMPRESS (16) CANCEL, EXIT
25
```

FIG. 13

APPARATUS FOR MAKING AND EDITING DICTIONARY ENTRIES IN A TEXT TO SPEECH CONVERSION SYSTEM

BACKGROUND OF THE INVENTION

1. Field of the Invention

The present invention relates to text to speech conversion systems for translating words represented by character codes into their spoken equivalents and more specifically to apparatus used to create and modify entries in the dictionaries employed in such systems to store phonemic representations of words.

2. Description of the Prior Art: FIGS. 1-3

In recent years, systems have become available by means of which text inputs may be converted into spoken outputs. Typically, these systems include microprocessors and software for converting the test inputs into a phonemic form and software and hardware for converting the phonemic form into sound waves representing the text string. The technology involved in such systems is explained in Geoff Bristow, editor, *Electronic Speech Synthesis*, Granada Publishing Ltd., 1984. A commercial example of such a system is the PROSE2000 (TM) text-to-speech converter made by Telesensory Systems, Inc. Operation of the PROSE2000 converter is set out in the *PROSE2000 Text-to-Speech Converter User's Manual*, Telesensory Systems, Inc., which is hereby incorporated into the present specification by reference.

FIG. 1 is a block diagram of a prior-art text to speech converter. In this figure and the ones that follow, functional components are represented by blocks and the flow of data between the functional components is represented by labelled arrows. Converter 101 receives text input and produces speech wave forms as output. The two main components of converter 101 are text-phonemic converter 103 and phonemic-speech converter 121. As shown by the arrows labelled TEXT and PR, Text-phonemic converter 103 receives the text input and produces from it a phonemic representation (PR) of the test. The phonemic representation contains codes indicating the phonemes for the spoken equivalent of the text. Included in the phonemes are indicators for word divisions, grammatical function, stress, and the pauses and intonation indicated by means of punctuation marks in the text. Phonemic-speech converter 121 receives the phonemic representation and produces therefrom speech waveforms for the spoken equivalent. The wave forms may then be output to audio devices such as amplifiers and loudspeakers. In the discussion and figures, these waveforms are termed speech output.

Of these components, only text-phonemic converter 103 is relevant to the invention disclosed herein, and consequently, internal details of only that component are shown in FIG. 1. In overview, text-phonemic converter 103 works as follows. It first normalizes the text in text normalizer (TN) 105, then determines in word look up (WL) 107 whether each word in the text is one of a set of exceptions to the normal phonetic rules of the language which are listed in dictionary (DICT) 109. If the word is not an exception, it may be converted directly into the corresponding phonemic representations in rule converter (RC) 119; if it is, the phonemic representation is obtained from DICT 109.

Continuing in greater detail, TN 105 is software which receives the text and normalizes it by separating it into words, replacing abbreviations and numbers with their full word equivalents, and deals with punctuation and other non-alphanumeric characters. TN 105 produces two outputs, the normalized text (NT), which goes directly to RC 119, and the words (W) from the text, which go to WL 107. If a word is an exception to the normal phonemic conversion rules, it will have a dictionary entry (DE) 111 in DICT 109. Thus, WL 107 can determine whether a word is an exception by looking it up in DICT 109. If the word is DICT 109, RC 119 obtains some or all of the information it needs to produce from DE 111 for the word; otherwise, RC 119 produces the phonemic representation solely from the normalized text.

DEs 111 are arranged in a fashion permitting quick and efficient search. The contents of a DE 111 are implementation dependent. One version is shown in FIG. 2. There, there are two kinds of DEs 111, stress DE (SDE) 201 and phonemic DE (PDE) 207. Both contain text form (TF) field 203, which contains the normalized text form of the word corresponding to the DE 111. SDE 201 additionally contains only stress information (SI) 205. SDE 201 is used for words whose phonemic representation is regular except for the manner in which they are stressed; PDE 207 is used for all other words whose phonemic representation is irregular. It contains phoneme form (PF) 209 of the word, indicating what phonemes it is made up of.

When WL 107 locates a DE 111 for a word, it indicates to RC 119 whether the DE 111 is a SDE 201. In that case, RC 119 fetches SI 205 and combines it with the phonemic form it derives using its rules to produce the phonemic representation. Otherwise, DE 111 is a PDE 207 and RC 119 used PF 209 to produce the phonemic representation.

In the prior art, a DICT 109 is produced in the manner shown in FIG. 3. First, the person producing DICT 109 uses an ordinary text editor to produce a text source dictionary (SRCDICT) 301 in a text file. SCRDICT 301 contains a number of source dictionary entries (SRCDEs) 303. Each SRCDE 303 contains at least a SRCTF 305, which is a text string representing the word for which the entry is being made, and SRCPF 307, which is a text representation of the phonemes representing the word. The forms and formats of the information in SRCTF 305 and SRCPF 307 are prescribed by the manufacturer of the text to speech converter for which the dictionary is being made. For example, a SRCDE 303 for the word "already" in the PROSE2000 text to speech converter must have SRCTF 305 and SRCPF 307 fields as follows:

ALREADY/wLR1eDE/

Once SCRDICT 301 is finished, the user runs a program, DICT MAKER 309, on SRCDICT 301. DICT MAKER 309 is analogous to a compiler and analyzes and compacts the information contained in SRCDICT 301 to produce DICT 109. When DICT 109 is made available to text-to-speech converter 101, the correctness of the phonemic representations in SRCPFs 307 in SRCDICT 301 may be tested by inputting text containing the words to text to speech converter 101 and listening to the results. If any of the words in DICT 109 is not satisfactorily pronounced by converter 101, the user must edit and corresponding SRCDE 303, run DICT MAKER 309 on SRCDICT 301, and again input text to converter 101 to test the result The above method of producing DICT 109 is difficult and time-consuming and requires special skills for determining the correct phonemic representation, but is adequate as long as DICT 109 rarely, if ever, changse. However, there are many possible applications for text to speech converter 101 in which the exceptions in DICT 109 may change frequently. For example, a person's name is one type of word which is frequently pronounced in a manner which is not completely regular. If a converter 101 is used in an application where it must pronounce names, many of the names will necessarily be included in DICT 109; further, and the names which converter 101 must pronounce are those of a group whose members fluctuate, the names may change frequently. Since it is important in such an application that DICT 109 contain the relevant names, and that converter 101 pronounce them correctly, a skilled and therefore expensive person will frequently need to alter DICT 109 by editing SRCDICT 301, running DICT MAKER 309 on it, and testing the new DICT 109 as just described.

As may be seen from the above discussion of the problems presented by names, what is needed in many potential applications for converter 101 is a means of adding and modifying DEs 111 which is faster, easier to use, and requires less skill than those presently available. The invention described herein provides such a means.

SUMMARY OF THE INVENTION

The present invention is interactive apparatus used in manipulation of a dictionary in a text to speech conversion system which permits the user to hear whether a phonemic representation is correct. Among the applications for the apparatus are systems for determining whether the phonemic representation currently contained in a dictionary entry is correct, systems for determining whether a dictionary entry is required for a text, and systems for editing dictionary entries.

In its generic form, the apparatus consists of input means for receiving dictionary manipulation commands including a play command from a user of the interactive apparatus and manipulation command execution means including play command execution means which responds to the play command by providing a phonemic representation to the speech conversion means. The input means may be any means by which a user can input commands; the command execution means may be any means responsive to the input commands for performing operations on the dictionary. Species of the present invention include apparatus for creating new dictionary entries, apparatus for editing existing dictionary entries, and apparatus for reviewing existing dictionary entries. The apparatus for creating the DE 111 includes an input device such as a keyboard and entry making means. The entry making means is generally a processor executing an entry making program. When executing the entry making program, the processing means must have access to the components of converter 101 and may be the microprocessor contained in converter 101. The person creating the DE 111 inputs the text to the entry making means. The entry making means provides the text as input to converter 101. Converter 101 operates in the manner described above to convert the text to a speech output. The person creating the DE 111 listens to the result; if the result is the correct pronunciation, RC 119 is capable of generating the proper phonemic represenation without the help of DICT 109 and no DE 111 for the text is necessary. If the result is not correct, the person creating the DE 111 inputs the enter command to the entry making means, which then makes a DE 111 for the text and places the DE 111 in DICT 109. Since the phonemic representation produced by RC 119 is generally at least partially correct, the DE 111 produced by the entry generator may contain that phonemic representation to serve as a starting point for later editing.

The user may then employ the apparatus for modifying the DE 111 to alter the phonemic representation so that converter 101 pronounces the text correctly. That apparatus includes at least input means such as a keyboard and editing means, which will generally be an editing program executing on a processor which, when executing the editing program, has access to the components of converter 101. The input means receives phonemic representation editing commands from the user. The apparatus for modifying the DE 111 operates as follows: the user employs the editing commands to modify the phonemic representation from the selected DE 111 and the editing apparatus provides the edited phonemic representation to the phonemic to speech converter. If the user is satisfied with the pronunciation which the phonemic to speech converter produces from the phonemic representation, the edited phonemic representation is now the phonemic representation in the selected DE 111; otherwise, he may continue editing.

While the above commands and components are sufficient for the invention to perform its function, ease of use is increased if display means such as a CRT is added, the editing is performed on a copy of the phonemic representation from the selected DE 111 instead of the contents of the DE 111 itself, and the commands are expanded to include a play command and an enter command. The display means displays at least the phonemic representation as currently edited; in response to any of the phonemic representation editing commands, the editing means modifies the copy and displays a visual representation of the copy as modified. The modified copy is not output to PSC 121. In response to the play command, the editing means inputs the present value of the copy of the phonemic representation to phonemic-speech converter 121. If the pronunciation is satisfactory, the user inputs the enter command. In response to that command, the editing means replaces the phonemic representation in the selected DE 111 with the present value of the copy. If the pronunciation is not satisfactory, the user may continue editing and playing the result as described above.

As may be seen from the above description, the apparatus of the present invention, by permitting addition of DEs 111 and modification thereof without editing SRCDICT 301 and running DICT MAKER 309 and providing immediate feedback regarding the need for a DE 111 for a text and the success of a modification of the phonemic representation, greatly reduces the effort and skill needed to alter DICT 109 and therefore increases the usability of text to speech converter 101 in situations requiring frequent changes in DICT 109.

It is thus an object of the invention to provide an improved text to speech conversion system.

It is another object of the invention to provide an improved means for manipulating a dictionary in a text to speech conversion system.

It is an additional object of the invention to provide means for determining whether a text to be converted by a text to speech conversion system requires an entry in the dictionary.

It is a further object of the invention to provide interactive means for creating an entry in a dictionary in a text to speech conversion system.

It is yet another object of the invention to provide interactive means for editing an entry in a dictionary in a text to speech conversion system.

It s a further object of the invention to provide means for editing an entry in a dictionary in a text to speech conversion system which permit the user to determine whether the edited entry results in the correct pronunciation.

Other objects and advantages of the present invention will be understood by those of ordinary skill in the art after referring to the detailed description of a preferred embodiment contained herein and to the drawings, wherein:

BRIEF DESCRIPTION OF THE DRAWINGS

FIG. 11 is a diagram of the screen for Scanner 901 in a preferred embodiment.

FIG. 12 is a diagram of the screen for Entry Generator 901 in a preferred embodiment.

FIG. 13 is a diagram of the screen for Editor 901 in a preferred embodiment.

Figure 1:
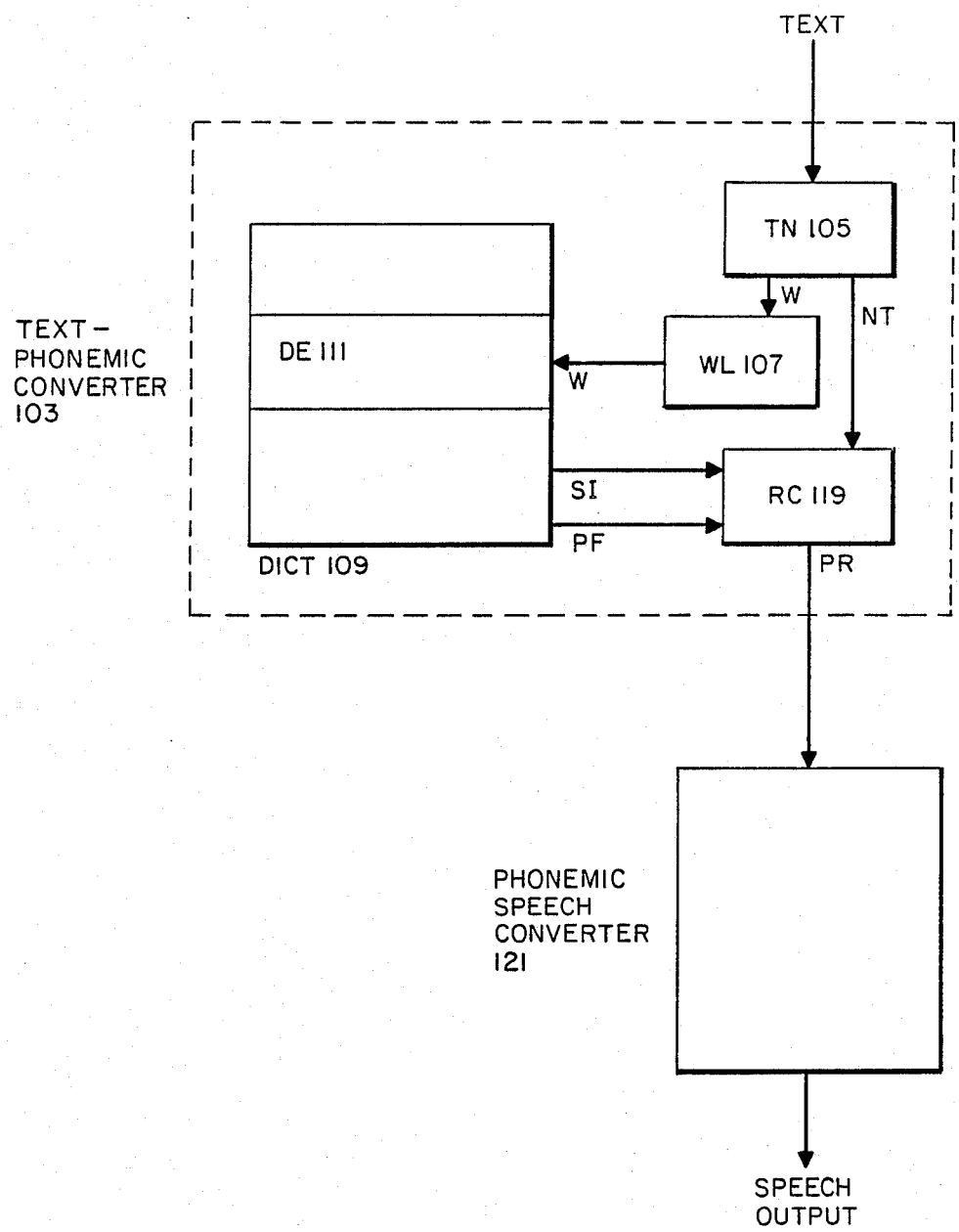
FIG. 1 is a block diagram of a prior-art text to speech converter.
Figures 2, 3:
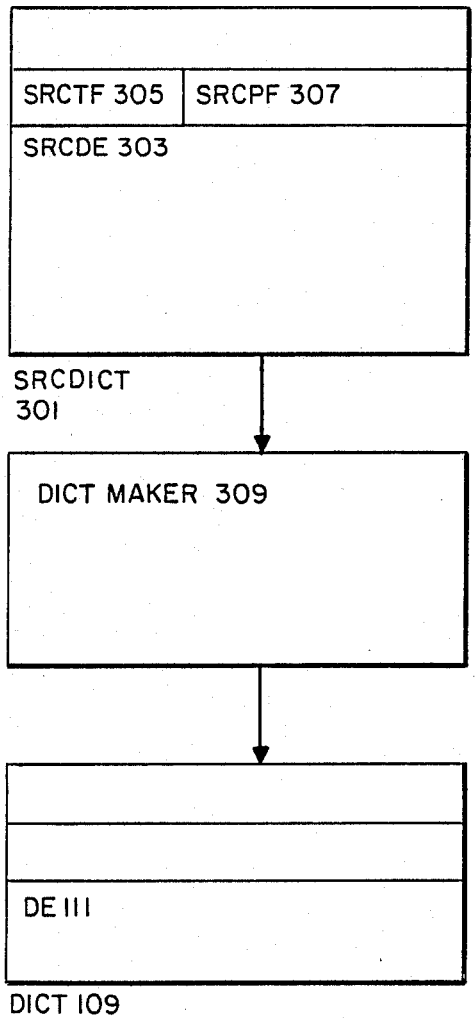
FIG. 2 is a block diagram of dictionary entries 111 used in the text to speech converter of FIG. 1.
FIG. 3 is a diagram of the manner in which the prior art produces and modifies dictionary entries 111.

Reference numbers in the figures have three or more digits. The two least-significant digits are reference numbers within a drawing; the more significant digits are the drawing number. For example, the reference number 201 refers to an item first shown in FIG. 2.

DESCRIPTION OF A PREFERRED EMBODIMENT

The following description of a preferred embodiment of the invention first describes the generic form of the present invention and then describes several specific forms. Finally, it describes certain aspects of a preferred embodiment of the invention in detail.

Figure 8:
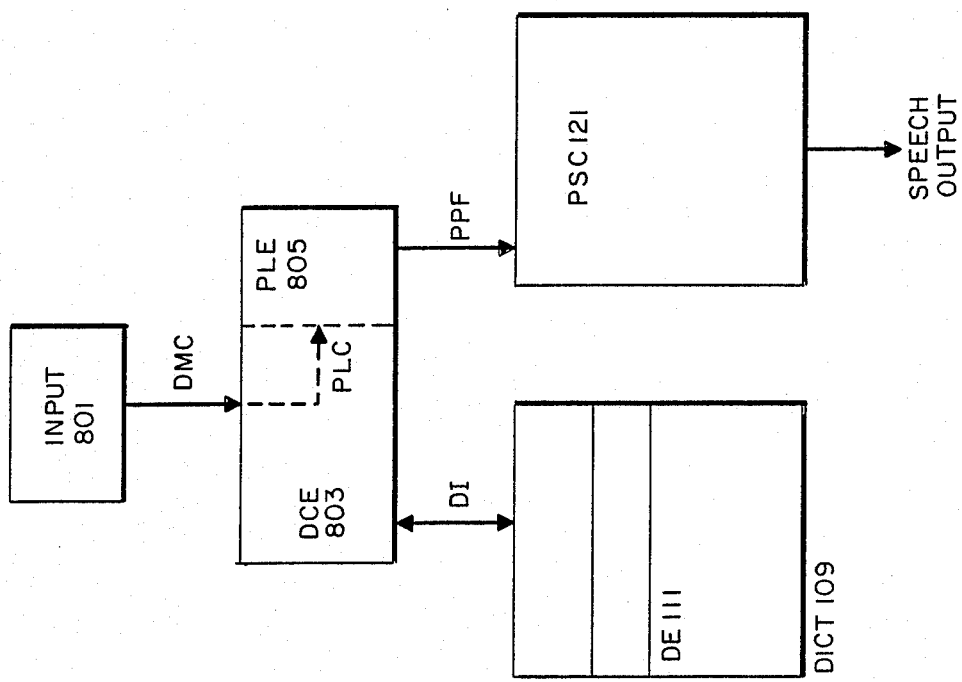
FIG. 8 is a block diagram of a generic form of the present invention.

1. Interactive Dictionary Manipulation Apparatus: FIG. 8

FIG. 8 shows the generic form of the present invention. The invention involves two components of converter 101, namely DICT 109 and PSC 121. The components of the invention itself are input 801, which may be any device capable of receiving input from a user of the invention and dictionary command execution means (DCE) 803, which may be any interactive system employed by a user of conversion system 101 to make, examine, or modify a DICT 109. As shown in FIG. 8, DCE 803 may receive information (DI) from or provide it to DICT 109 and operates on that information and on DICT 109 in response to dictionary manipulation commands (DMC) received from input 801. Generally, DCE 803 is implemented by means of a program executing on a processor having access to the components of system 101. In the present invention, the dictionary manipulation commands include a play command (PLC) and DCE 803 includes play command execution means (PLE) 805. PLE 805 responds to a play command by providing a phonemic representation to be played (PPF) to PSC 121, which produces speech output therefrom. For purposes of this disclosure, the play command may be defined as any command which has the effect of providing a phonemic representation to be played to PSC 121 and the play command execution means may be defined as any component of DCE 803 which provides a phonemic representation to PSC 121 for the purpose of determining how converter 101 "pronounces" it.

Operation of interactive dictionary manipulation apparatus of the present invention is as follows: when a user wishes to hear a phonemic representation relating to a DE 111, the user provides a play command to input 801. DCE 803 then provides the desired phonemic representation (PPF) to PSC 121, which uses it to generate speech output. Guided by the speech output, the user can continue his manipulation of the dictionary using DCE 803. The play command may be either explicitly provided by the user or provided implicitly as part of another command. For example, DCE 803 might respond to a command to display the contents of a selected DE 111 by actions including causing PLE 805 to provide PF 209 from the selected entry to PSC 121.

Figure 4:
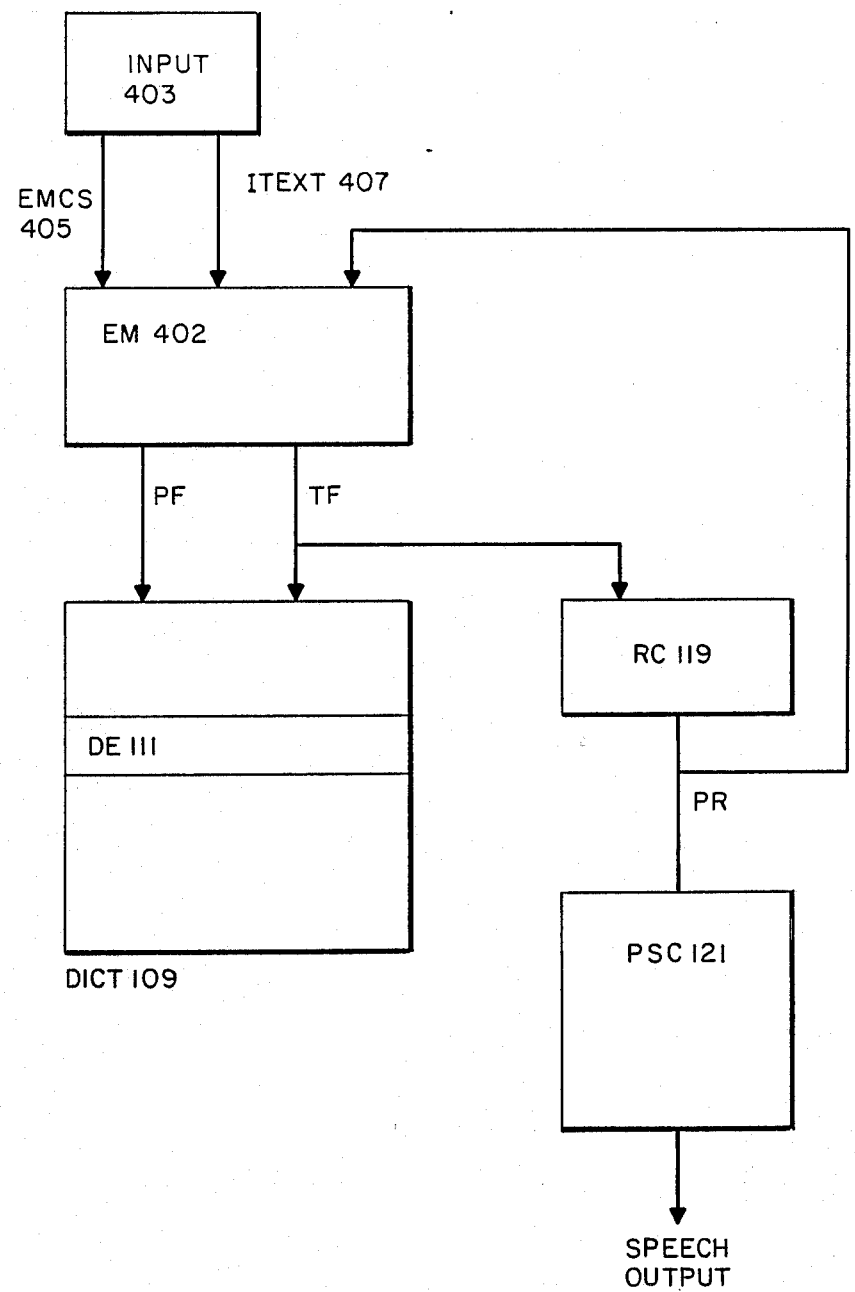
FIG. 4 is a block diagram of the interactive dictionary entry generator of the present invention.
Figure 5:
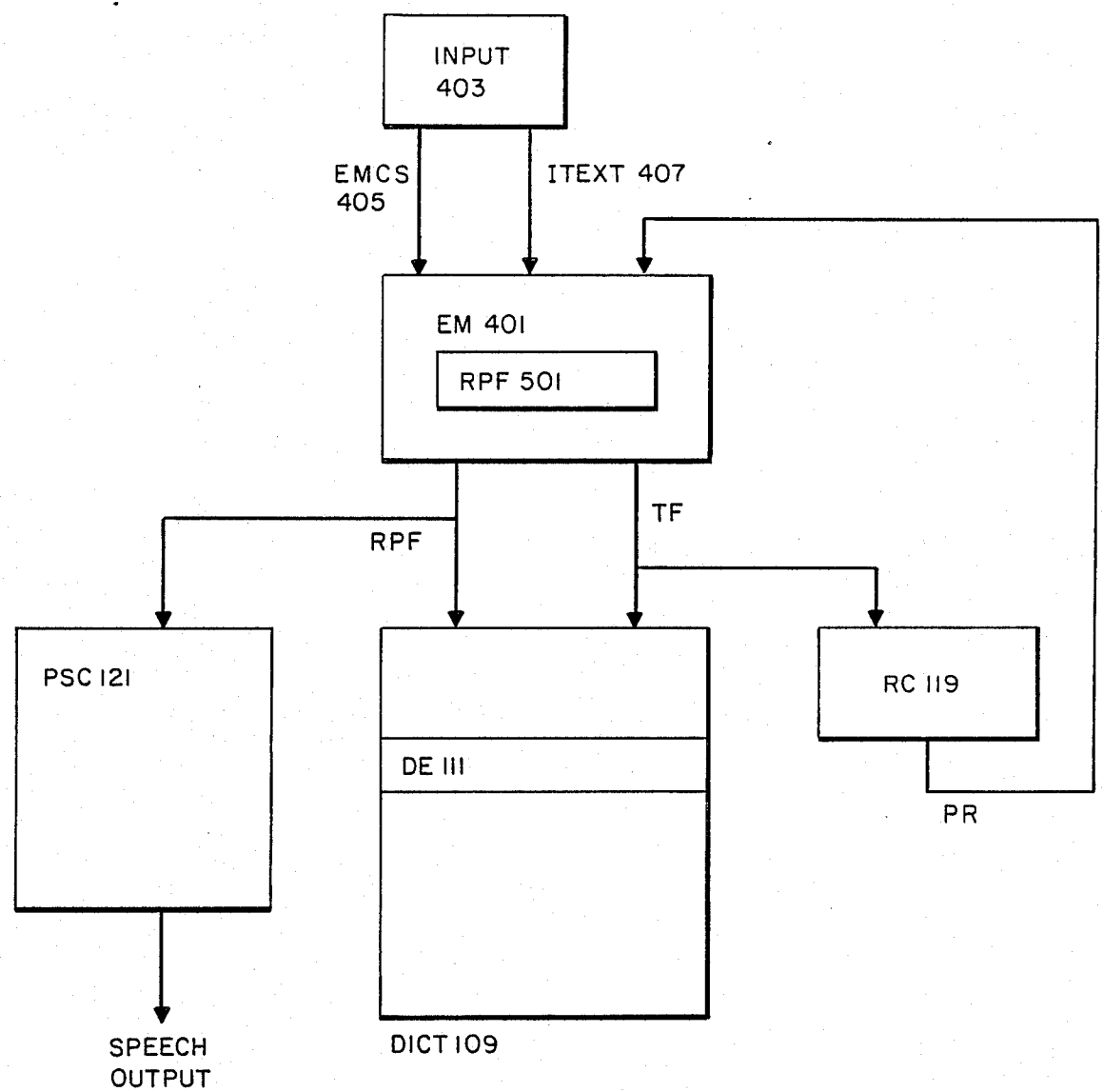
FIG. 5 is a block diagram of an alternative embodiment of the interactive dictionary entry generator of the present invention.

2. The Interactive Dictionary Entry Generator: FIGS. 4 and 5

The interactive dictionary entry generator generatse a new entry in DICT 109 when the person using the dictionary entry generator determines that RC 119 is unable to produce the correct phonemic representation of a text. FIG. 4 is a block diagram of interactive dictionary entry generator 401 in a preferred embodiment.

Interactive dictionary entry generator 401 uses DICT 109, RC 119, and phonemic representation to speech converter (PSC) 121 of converter 101 described in the discussion of the prior art. These components operate in the same fashion in generator 401 as in converter 101. Interactive dictionary generator 401 further consists of INPUT 403, which receives input from the user, and entry maker (EM) 402, which makes a new DE 111 in DICT 109. In a preferred embodiment, INPUT 403 is a standard terminal keyboard, but any other input may be employed which provides a representation of a text. EM 402 is a processor executing an entry maker program. The processor may be any processor which has access to DICT 109, RC 119, and PSC 121 of converter 101. The entry maker program gains access to RC 119 and PSC 121 by performing calls to the software associated with those components in converter 101. INPUT 403 provides two kinds of input to EM 402: ITEXT 407, which is the text which may require an entry in DICT 109, and entry making commands (EMCS) 405, which are the commands which control operation of EM 402. The exact commands are implementation-dependent, but at a minimum, they will include a make entry command to which EM 402 responds by creating a new DE 111 in DICT 109 and a stop command to which EM 402 responds by ceasing execution. The commands may be entered by any means used in the art; for example, they may be character-string commands, they may be entered using function keys, or they may be entered using menus or pointing devices such as the mouse.

When EM 402 receives ITEXT 407, it provides the text, as shown by the arrow labelled TF, to RC 119, which converts ITEXT to its corresponding phonemic representation. As shown by the arrow marked PR, the phonemic representation produced by RC 119 goes to PSC 121 for conversion to a speech output and also to EM 402. If the conversion to a speech output produces results acceptable to the user, no entry is necessary and the user provides the stop command to EM 402. If the conversion produces unacceptable results, and entry is necessary and the user provides the make entry command to EM 402. In response to that command, EM 402 makes a new DE 111 in which TF 203 contains ITEXT 407 and PF 209 contains the phonemic representation produced by RC 119 from ITEXT 407. The setting of PF 209 from the phonemic representation is not necessary for operation of the invention, but is convenient, since it provides a phonemic representation which will generally be at least partially correct and which therefore can later be easily edited to produce the correct phonemic representation.

An alternative embodiment of generator 401 which operates according to substantially the same principles as the embodiment of FIG. 4 but is easier to use is shown in FIG. 5. The only additional elements are RPF 501, a register or buffer accessible to EM 402 which contains the phonetic representation of ITEXT 407 produced by RC 119 and an additional entry maker command, play. In the alternative embodiment, the user inputs ITEXT 407 as before, but EM 402 does nothing with ITEXT 407 until it receives either a play command or a make entry command. In response to the play command, EM 402 provides ITEXT 407 to RC 119, receives the phonemic representation from RC 119, as shown by the arrow PR, stores it in RPF 501, and then provides the representation stored in RPF 501 to PSC 121 for conversion to speech output, as shown by the arrow RPF. In response to the make entry command, EM 402 receives the phonemic representation of ITEXT from RC 119 as described above and then stores the contents of RPF 501 in PF 209 of the new entry. As before, TF 203 contains ITEXT 407.

As is well-known to those skilled in the art, EM 402 must, in addition to performing the functions just described, deal with various error conditions such as the failure of the user to input ITEXT 407, an ITEXT 407 which is too large for a DICT 109 entry, an ITEXT which already has an entry in DICT 109, or an empty DICT 109. Ways to deal with these error conditions are well-known in the art, and since one skilled in the art may understand the invention without reference to these error conditions and the manner in which they are handled, neither the specific error conditions of the preferred embodiment nor the specific techniques used to deal with them are further discussed here.

Figure 6:
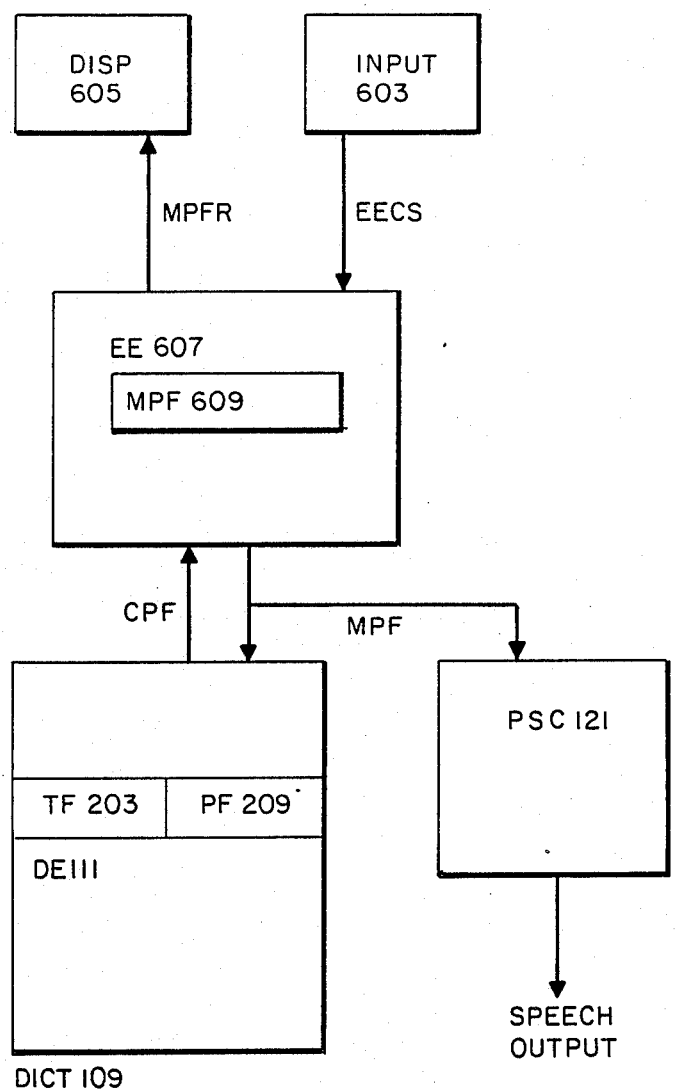
FIG. 6 is a block diagram of the interactive dictionary entry editor of the present invention.
Figure 7:
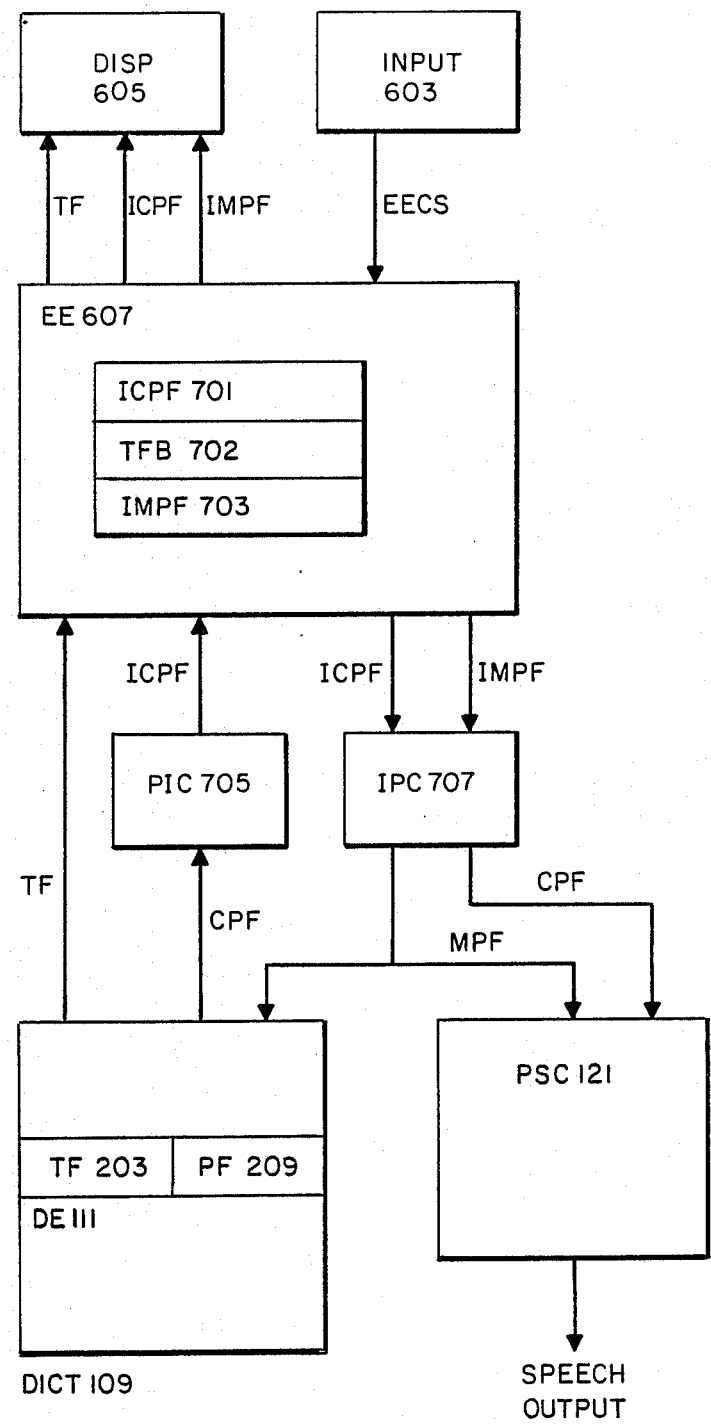
FIG. 7 is a block diagram of an alternative embodiment of the interactive dictionary entry editor of the present invention.

3. Interactive Dictionary Entry Editor: FIGS. 6 and 7

The interactive dictionary editor of the present invention permits a user of converter 101 to edit a DE 111 for a text so that its PF 209 is the correct phonemic representation of the pronunciation of that text. FIG. 6 is a block diagram of interactive dictionary entry editor 601 of the present invention. As may be seen from that figure, editor 601 employs two components of converter 101: DICT 109 and PSC 121. The components of editor 601 itself consist of DISP 605, which is a visual display such as a CRT screen which is capable of displaying text, INPUT 603, which is an input device such as a keyboard which is capable of inputting commands, and entry editor (EE) 607, which is a processor executing an entry editor program. The processor must have access to PSC 121 of converter 101. The entry editor program gains access to PSC 121 by performing calls to the software associated with those components in converter 101.

INPUT 603 provides the commands (EECs) by which the user controls EE 607 to EE 607. The commands available to the user are implementation-dependent, but at a minimum, they will include phonemic representation editing commands. The phonemic representation editing commands permit the user to edit PF 209 in a selected DE 111 by adding, deleting, or replacing phonemes. The usefulness of EE 607 is greatly increased if the commands further include a play command and an enter command. The play command permits the user to hear the pronunciation specified by the phonemes as they have been edited. The enter command permits the user to wait until he is sure he has what he wants before he makes the edited phonemic representation the new value of PF 209 in the selected DE 111. As with entry generator 401, the commands may be entered by any means used in the art.

While not strictly necessry for the invention, DISP 605 greatly increases the invention's usefulness by providing a visual representation of the phonemic representation being edited to the user. In addition, DISP 605 may provide a visual representation of the text to which the phonemic representation corresponds and explanations of the meanings of the symbols used in the phonemic representation.

EE 607 displays the results of editing, plays the results of editing, and alters DE 111 in response to commands from input 603. EE 607 has access in a present embodiment of MPF 609, a buffer or register which, at the beginning of editing, contains a copy of PF 209 from a selected DE 111. In a present embodiment, DE 111 has been selected and its PF 209 copied into MPF 608 before beginning of operation of EE 607. In other embodiments, there may be a select entry command by which the user can select the entry to be modified. In that case, EE 607 will respond to that command by copying PF 209 from the selected DE 111 into MPF 609.

Once PF 209 has been copied into MPF 609, EE 607 outputs MPFR, a printable version of the current value of MPF 609, to DISP 605. If the phonemic representation in PF 209 consists of codes corresponding to printable characters, EE 607 may simply output those codes to DISP 605; if other codes are used, EE 607 will convert the codes to printable codes before outputting MPFR to DISP 605.

In response to a phonemic representation editing command from the user, EE 607 performs the requested editing operation on the phonemic representation contained in MPF 609 and outputs MPFR corresponding to the new value to DISP 605 so that the user can see the results of his editing operation. In a preferred embodiment, the user can hear the results of his editing operation by using the play command. In response to that command, EE 607 outputs the current value of MPF 609 to PSC 121, which then produces the corresponding speech output. In a preferred embodiment, the user can further employ the enter command when he is satisfied with the results of his editing. In response to that command, EE 607 replaces the value of PF 209 in the selected DE 111 with the current value of MPF 609, as shown by the arrow labelled MPF, and ceases operation. Additionally, a preferred embodiment includes a stop command to which EE 607 responds by ceasing operation without replacing the value of PF 209 in the selected DE 111.

An alternative embodiment of editor 601 which operates according to substantially the same principles but is easier to use is shown in FIG. 7. From the user's point of view, the main differences between the embodiment of FIG. 6 and that of FIG. 7 are that the embodiment of FIG. 7 displays TF 203 and a representation of PF 209 from the selected DE 111 throughout the editing session and the user can play either the value of PF 209 or the value which has resulted from his editing throughout the editing session. A further difference which is not visible to the user is that EE 607 employs an internal phonemic representation different from that used in DE 111 and converts between representations when it receives PF 209 from DE 111 or outputs an edited representation to DE 111 or PSC 121. Use of the internal phonemic representation permits a display of the phonemic representation on DISP 605 which is easier for the user to understand than if the phonemic representation employed in PF 209 had simply been output to DISP 605.

In terms of structure, the alternative embodiment differs from that of FIG. 6 in the following particulars: EE 607 now has access to three buffers, internal current phonemic form buffer (ICPF) 70a, internal modified phonemic form buffer (IMPF) 703, and text form buffer (TFB) 702. ICPF 701 contains the internal phonemic representation of the value of PF 209 from DE 111 being modified throughout the editing session. IMPF 703 contains the edited internal phonemic representation, and is thus the functional equivalent of MPF 609. TFB 702 contains the value of TF 203 from DE 111 being modified. In addition, EE 607 employs two conversion routines, PIC 705 and IPC 707, for converting between the phonemic representation used in DICT 109 and PSC 121 and the internal phonemic representation. PIC 705 converts from the former to the latter and IPC 707 from the latter to the former.

Operation of the alternative embodiment is as follows: before beginning of operation of EE 607, TF 203 from the selected DE 111 has been copied into TFB 702 and PF 209 from the selected DE 111 has been converted to the internal representation in PIC 705 and the result of the conversion copies into ICPF 701 and IMPF 703. Upon beginning of operation, EE 607 outputs the contents of these buffers together with appropriate text to DISP 605, which thus effectively displays the selected DE 111. In response to an editing command, EE 607 modifies IMPF 703 and outputs the result of the modification to DISP 605. In response to a play command specifying the original value of PF 209, EE 607 outputs the contents of ICPF 701 to IPC 707 and the converted value to PSC 121; in response to a play command specifying edited value of PF 209, EE 607 outputs the contents of IMPF 701 in the same fashion. In response to the enter command, finally, EE 607 outputs the contents of IMPF 703 to IPC 707 and the converted value to PF 209 in the selected DE 111 and then terminates operation.

As is well-known to those skilled in the art, EE 607 must, in addition to performing the functions just described, deal with various error conditions such as an edited phonemic representation which is too large for the system to deal with, attempting to play ICPF 701 or IMPF 703 when it contains no phonemic representation, or an error in modifying DE 111. Ways to deal with these error conditions are well-known in the art, and since the invention may be understood by one skilled in the art without reference to the error conditions, the specific conditions and the techniques used to deal with them in the preferred embodiment are not further discussed here.

Figure 9:
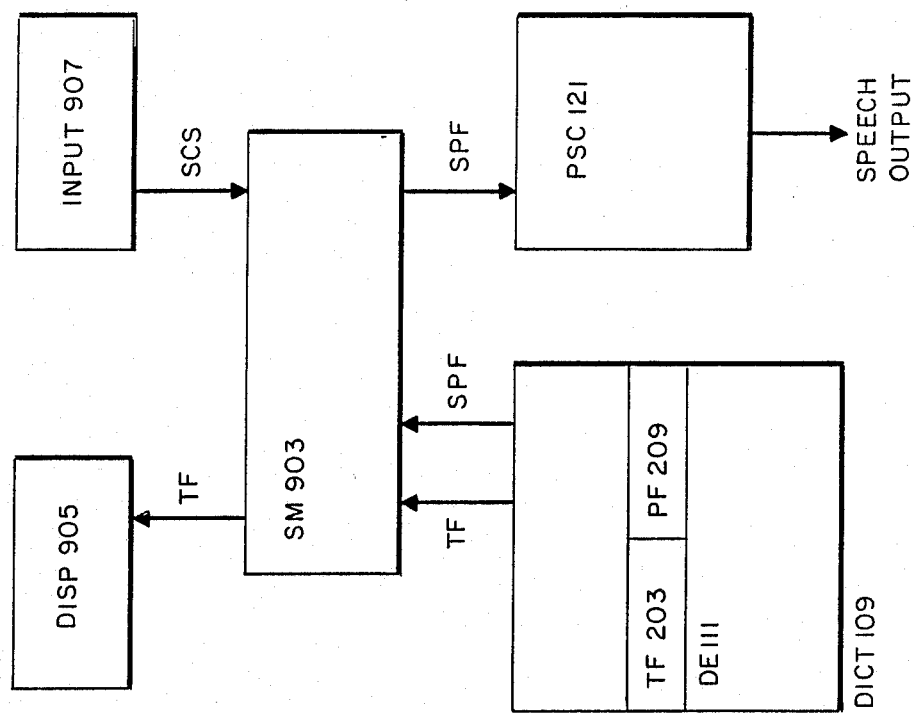
FIG. 9 is a block diagram of an interactive dictionary scanner of the present invention.

4. The Interactive Dictionary Scanner: FIG. 9

The Interactive dictionary scanner of the present invention is used to determine what texts a DICT 109 contains DEs 111 for and what the phonemic representation currently contained in PF 209 for the entry sounds like. The interactive dictionary scanner uses DICT 109 and PSC 121 from converter 101. The components of the invention include DISP 905, which will generally be a CRT display device, but may be any visual display device capable of displaying characters, INPUT 907, which may be a keyboard or any other device by which a user may provide inputs, and scanning means (SM) 903, which will generally be a program executing on a processor having access to DICT 109 and PSC 121.

DISP 905 is used in the present invention to display a list of the texts contained in the dictionary being scanned. The user employs INPUT 907 to input scanning commands including navigation commands for moving up and down the list, a search command for searching the dictionary for a DE 111 for a specific text, a selection command for selecting a specific DE 111, and a play command for hearing the speech produced in response to the selected DE 111's PF 209.

Operation of the invention is as follows: At the beginning of operation, SM 903 outputs a screen to DISP 905 containing a list of as many values of TFs 203 from DEs 111 in DICT 109 as will fit conveniently on the screen of DISP 905. The list is organized alphabetically, beginning with A. If DICT 109 contains more DEs 111 than may be listed at one time on the screen, the user may employ navigation commands to move down the list and back up. In response to a navigation command, SM 903 outputs another screen of TFs 203. In a preferred embodiment, the user selects a DE 111 from the displayed list by moving the cursor on his screen to the position in the displayed list of the TF 203 from the DE 111. If the user knows that text he is looking for, he can specify the text in a search command. In response to that command, SM 903 searches through the TFs 203 in DICT 109 until it finds the proper text, displays the list of TFs 203 containing that text on DISP 905, and moves the cursor to the location on the screen of the text being searched for. In response to the play command, SM 903 provides PF 209 for the DE 111 specified by the current cursor position (SPF) to PSC 121, which produces the speech output corresponding to the phonemic representation in PF 209. Scanner 901 may thus be used to rapidly navigate through a DICT 109 and determine whether a text has a DE 111 therein and if it does, what speech output is produced by PSC 121 in response to PF 209 in the text's DE 111.

Figure 10:
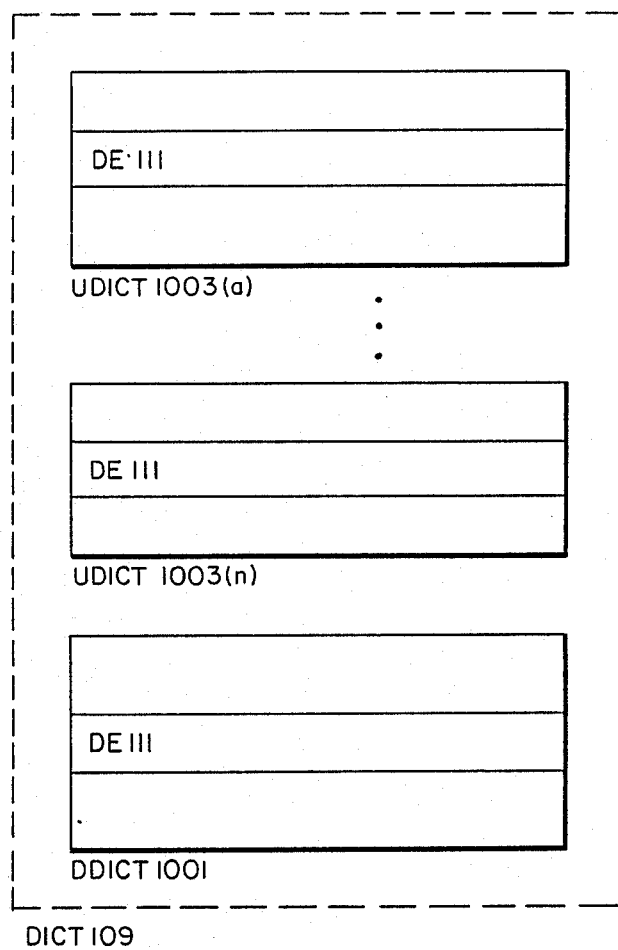
FIG. 10 is a block diagram of DICT 109 in a preferred embodiment of the invention.

5. DICT 109 in a Preferred Embodiment: FIG. 10

In a preferred embodiment, DICT 109 is made up of a set of dictionaries. Such a set of dictionaries is shown in FIG. 10. The set of dictionaries used by converter 101 in a preferred embodiment must at a minimum contain default dictionary (DDICT) 1001. DDICT 1001 contains DEs 111 for those exceptions which any converter 101 converting text to speech for a given language must be prepared to handle. In addition, the set may contain one or more user dictionaries (UDICT) 1003. Each UDICT 1003 contains DEs 111 for a set of exceptions peculiar to a given application of converter 101. The DEs 111 in all of the dictionaries must specify the phonemic representation of the text for the entry, but the DEs 111 in UDICTs 1003 need not be identical in all respects to those in DDICT 1001. In a present embodiment, WL 107 searches DICT 109 by first searching UDICTs 1003 in the order in which they occur in DICT 109 and then searching DDICT 1001. UDICTs 1003 and DDICT 1001 in a preferred embodiment are implemented as indexed files. Each DE 111 is a record in the dictionary file, and TF 203 is used as the record's index. Consequently, WL 107 may use a given text to randomly access its DE 111. In order to speed operation of converter 101, the dictionaries are loaded into random access memory before operation of converter 101.

6. Screens for Preferred Embodiments of Scanner 901, Entry Generator 401, and Entry Editor 601: FIGS. 11-13

In a preferred embodiment, Scanner 901, Entry Generator 401, and Entry Editor 601 are components of a utility for manipulating DICT 109 called the Custom Dictionary Editor. The interaction between a user of the utility and the utility is controlled by means of screens which appear on the user's terminal. Each screen indicates to the user what operations he is currently able to perform on DICT 109 and what he must do to perform them. For certain operations, when the user selects and performs an operation, the screen will show the results of the operation. The screens thus provide one skilled in the art with a detailed disclosure of the manner in which the user interacts with a preferred embodiment of the invention and of the manner of operation of the preferred embodiment.

Beginning with FIG. 11, that figure is a diagram of the screen for Scanner 901. Fields of special interest in the screen have reference numbers. Field 1101 contains the name of the file containing DDICT 1001 or UDICT 1003 currently being manipulated by the Custom Dictionary Editor. Field 1103 contains the text which was selected by the last selection operation. Field 1105 contains that portion of the list of TFs 203 from the specified dictionary which will fit on the screen. The list is in alphabetical order, and cursor keys on the keyboard may be used to move the cursor to the head of a given entry in the list. That entry is then the current word. Field 1107 contains other commands which Scanner 901 is capable of executing. The user specifies a command by hitting the program function key on his terminal which has the number specified in parentheses to the left of the command.

The commands which are germane to the present discussion have the following effects:

EXECUTE, Edit: Editor 601 is executed for the text specified in current word 1103 and its first screen is displayed.

PREV, NEXT: the preceding or following screen of the list made from the TFs 203 in the dictionary is displayed in field 1105.

INSERT: Execution of Entry Generator 401 begins and its first screen is displayed.

DELETE: DE 111 specified by current word 1103 is deleted from the dictionary specified by field 1101.

SEARCH: A new screen requesting a text to search for is displayed. The user inputs the text, and if the search is successful, the TF 203 matching the text becomes the current word.

PLAY cur. word 1109: The play command. PF 209 for DE 111 is provided to PSC 121.

Instructions: when this command is given, Scanner 901 displays a HELP screen further explaining how to use Scanner 901.

CANCEL: the stop command: Scanner 901 ceases execution and the program which invoked Scanner 901 resumes execution.

Continuing with the screen for entry generator 401, that screen contains field 1101, field 1202, in which the user may enter the text he wishes to add to the dictionary specified in field 1101, and field 1203, indicating the operations he may perform. INSTRUCTIONS and CANCEL have the same effect for entry generator 401 as they have for scanner 901. EXECUTE results in the creation of a DE 111 for the word specified in field 1201 and the execution of Editor 601 for the DE 111 corresponding to the word specified in field 1201. As previously mentioned, PF 209 in the new DE 111 contains the phonemic representation produced by RC 119. PLAY new word 1205 results in the creation of a phonemic representation by RC 119 and presentation of the phonemic representation of PSC 121. Generally speaking, a user will work with screen 12 as follows: after inputting the new word into field 1201, he will hit the function key for PLAY 1205; if the resulting speech output is satisfactory, no DE 111 for the word is required and the user will hit the CANCEL function key; if it is not satisfactory, he will hit the EXECUTE function key, thereby creating the new DE 111 and invoking Editor 601 for its modification.

Turning now to FIG. 13, the diagram of the screen for Editor 601, that screen, too, contains field 1101 specifying the dictionary being edited and 1103 specifying the current word, which in this case is the word whose DE 111 was selected for editing. Field 1301 contains the phonemic representation from ICPF 701 and thus indicates the value of PF 209 in the DE 111 being edited. Field 1303 contains the phonemic representation from IMPF 703, and thus shows the result of the editing operations. Field 1307 contains all of the codes which may appear in field 1301 or be used in field 1303 and examples of their meanings. Field 1309 contains the commands available to the user of a preferred embodiment of Editor 601. Included in those commands are Play phonemes command 1311 and Play cur. word command 1313.

When the screen of FIG. 13 appears at the user's terminal, the cursor is at the first phoneme code in field 1303. Using the cursor keys, the user can maneuver to the beginning of a phoneme code and type in the characters for one of the phoneme codes specified in field 1307. If the user wishes to insert a phoneme, he moves the cursor in field 1303 to the phoneme code ahead of which he wishes to insert a phoneme and strikes the Insert phoneme function key. A place where the user may insert an additional phoneme code appears at the cursor location in field 1303, and the user inserts the desired phoneme code at that location. If the user wishes to delete a phoneme, he moves the cursor in field 1303 to the phoneme code he wishes to delete and strikes the Delete phoneme function key. If the uesr desires to PLAY the phonemic representation indicated by field 1301, he hits the Play cur. word 1313 functions key and the contents of ICPF 701 are converted by IPC 707 to CPF and output to PSC 121 as previously described; if he desires to PLAY the phonemic representation currently indicated by field 1303, he strikes the Play phonemes 1311 function key and the contents of IMPF 703 are converted by IPC 707 to MPF and output to PSC 121 as previously described. If the user wants to quit without altering DE 111 being edited, he strikes the CANCEL function key, resulting in the termination of execution of Editor 601 and return to the program form which it was invoked. If the user wants to enter the current value of field 1303 in PF 209, he hits the EXECUTE function key, to which Editor 601 responds by converting IMPF 703 to MPF in IPC 707, placing the converted result in PF 209, terminating its execution, and returning to the program from which it was invoked. Enter and compress, finally, is used when the user is finished editing not only DE 111, but the dictionary which contains DE 111. In that case, PF 209 is set from IMPF 703 as previously described and in addition, a compression program is run which reduces the size of the DEs 111 which were added to the file. On termination of execution of the compression program, Editor 601 terminates and returns to the program from which it was invoked.

7. Conclusion

The foregoing Description of a Preferred Embodiment has disclosed how apparatus for manipulating the dictionaries used in text to speech converters may be constructed which permits the person manipulating the dictionary to immediately determine whether a phonemic representation connected with the dictionary manipulation produces the correct pronunciation of a word. While the foregoing disclosure has disclosed a generic form of the invention and three specific forms thereof, it should be emphasized that the disclosed embodiments are exemplary and that other embodiments differing from the disclosed embodiments but within the concept of the invention are possible.

In particular, it should be emphasized that the concept of the invention extends to any interactive command which has the effect of the play command described herein. The command may explicitly specify that a phonemic representation be "pronounced" by converter 101, or the command may specify other operations but also result in the pronunciation of a phonemic representation. Further, through the text to speech converter in which a preferred embodiment is employed converts text to english speech, versions of the invention may be used with text to speech converters operating in any language. Moreover, the invention is not dependent on specific phonemic representations, specific forms of DE 111, or specific forms of interaction between the user and the input device or display devices.

Thus, the scope of the invention is not limited by the embodiments disclosed herein, but is instead determined solely by the appended claims and includes all embodiments which come within the meaning and range of equivalency of the claims.

What is claimed is:

1. In a text to speech conversion system including
    rule conversion means for converting a text to a phonemic representation thereof according to rules,
    dictionary means for storing dictionary entries for text not correctly convertible according to the rules and containing phonemic representations of the unconvertible text, and
    phonemic representation to speech conversion means for converting a phonemic representation into a voice signal,
  an interactive dictionary entry generator comprising:
    input means for receiving a text and a make entry command; and
    entry making means for receiving the text from the input means and responding thereto by using the rule conversion means and the phonemic representation to speech conversion means to convert the text to a voice signal, and for receiving the make entry command and responding thereto by making a dictionary entry for the received text,
      whereby a user of the interactive dictionary entry generator may determine whether a dictionary entry for the received text is necessary and if it is, create the dictionary entry for later editing.

2. In a text to speech conversion system including
    dictionary means for storing dictionary entries for text and containing phonemic representations of the text, and
    phonemic representation to speech conversion means for transforming a phonemic representation into a voice signal,
  an interactive dictionary entry editor comprising:
    input means for receiving phonemic representation editing commands; and
    editing means for receiving the phonemic representation editing commands from the input means and responding thereto by editing the phonemic representation from a selected dictionary entry and providing the edited phonemic representation to the phonemic representation to speech conversion means.

3. In a text to speech conversion system including
    dictionary means for storing dictionary entries for text and containing phonemic represenations of the text, and
    phonemic representation to speech conversion means for transforming a phonemic representation into a voice signal,
  interactive dictionary manipulation apparatus comprising:
    input means for receiving dictionary manipulation commands including a play command from a user of the interactive dictionary manipulation apparatus; and
    dictionary manipulation command execution means for receiving the dictionary manipulation commands from the input means and responding thereto by manipulating the dictionary means, the manipulations including responding to the play command by providing a phonemic representation specified by a manipulation command to the phonemic representation to speech conversion means.

4. In the dictionary manipulation apparatus of claim 3 and wherein:
    the dictionary manipulation commands include phonemic representation editing commands; and
    the dictionary manipulation command execution means responds to the phonemic repesentation editing commands by editing the phonemic representation from a selected dictionary entry and to the play command by provide the edited phonemic representation to the phonemic representation to speech conversion means.

5. In the dictionary manipulation apparatus of claim 4 and wherein:
the dictionary manipulation apparatus further comprises display means responsive to the dictionary manipulation command execution means; and
the dictionary manipulation command execution means displays the edited phonemic representation on the display means.

6. In the dictionary manipulation apparatus of claim 5 and wherein:
the dictionary manipulation command execution means additionally displays the unedited phonemic representation on the display means;
the dictionary manipulation commands include a first play command and a second play command; and
the dictionary manipulation command execution means responds to the first play command by providing the unedited phonemic representation to the phonemic representation to speech conversion means to the second play command by providing the edited phonemic representation to the phonemic representation to speech conversion means.

7. In the dictionary manipulation apparatus of claim 4 and wherein:
the dictionary manipulation commands include an enter command; and
the dictionary manipulation command execution means responds to the enter command by storing the edited phonemic representation in the selected dictionary entry.

8. In the intereactive dictionary manipulation apparatus of claim 3 and wherein:
the dictionary manipulation apparatus further comprises display means responsive to the dictionary manipulation command execution means for indicating which of the dictionary manipulation commands are currently valid.

9. In the interactive dictionary manipulation apparatus of claim 8 and wherein:
the input means includes program function keys for inputting the dictionary manipulation commands; and
the display means indicates which of the program function keys correspond to the currently-valid dictionary manipulation commands.

10. In the dictionary manipulation apparatus of claim 3 and wherein:
the text to speech conversion system further includes rule conversion means for converting a text to a phonemic representation thereof according to rules;
the input means further receives a text to be converted in the rule conversion means;
the dictionary manipulation commands include a make dictionary entry command; and
the dictionary manipulation command execution means responds to the play command and the received text by using the rule conversion means and the phonemic representation to speech conversion means to convert the text to a voice signal and responds to the make dictionary entry command by making a dictionary entry for the received text containing the phonemic representation produced by the rule conversion means.

11. In the dictionary manipulation apparatus of claim 10 and wherein:
the dictionary manipulation commands further include phonemic representation editing commands; and
the dictionary manipulation command execution means responds to the make entry command by making the phonemic representation editing commands available at the input means and to the phonemic representation editing commands by editing the phonemic representation from the new dictionary entry and employing the play command to provide the edited phonemic representation to the phonemic representation to speech conversion means.

12. In the dictionary manipulation apparatus of claim 3 and wherein:
the dictionary manipulation commands include dictionary scanning commands including an entry selection command; and
the dictionary manipulation command execution means responds to the entry selection command by selecting one of the dictionary entries and to the play command by providing the phonemic representation contained in the selected entry to the phonemic representation to speech conversion means.

13. In the dictionary manipulation apparatus of claim 12 and wherein:
the dictionary manipulation commands further include an edit entry command and a plurality of phonemic representation editing commands; and
the dictionary manipulation command execution means responds to the edit entry command by making the phonemic representation editing commands available at the input means and to the phonemic representation editing commands by editing the phonemic representation from the selected dictionary entry and employing the play command to provide the edited phonemic representation to the phonemic representation to speech conversion means.

14. In a text to speech conversion system including
dictionary means for storing dictionary entries for text and containing phonemic representations of the text, and
phonemic representation to speech conversion means for transforming a phonemic representation into a voice signal,
the method of editing one of the dictionary entries comprising the steps of:
receiving an editing command from input means in command execution means and responding thereto by editing the phonemic representation in the one dictionary entry as specified in the command;
receiving a play command from the input means in the command execution means and responding thereto by providing the edited phonemic representation to the phonemic representation to speech conversion means; and
repeating the preceding steps in any order until receiving a termination command from the input means in the command execution means and responding thereto by terminating editing of the one dictionary entry.

15. In the method of claim 14 and further comprising the step of:
  receiving an entry selection command in the command execution means from the input means which specifies the one dictionary entry from the input means in the command execution means.

16. In the method of claim 15 and wherein:
  the step of receiving an entry selection command includes the step of creating a new dictionary entry and the entry selection command specifies the new dictionary entry as the one dictionary entry.

17. In the method of claim 14 and wherein:
  the termination command is an enter command; and
  the command execution means responds to the enter command by performing the step of storing the edited phonemic representation in the one dictionary entry before terminating editing.

18. In the method of claim 17 and wherein:
  the termination command is alternatively a cancel command; and the command execution means responds to the cancel command by terminating editing without changing the phonemic representation in the one dictionary entry.

* * * * *

UNITED STATES PATENT AND TRADEMARK OFFICE
CERTIFICATE OF CORRECTION

PATENT NO. : 4,831,654

DATED : May 16, 1989

INVENTOR(S) : Colleen R. Dick

It is certified that error appears in the above-identified patent and that said Letters Patent is hereby corrected as shown below:

Column 14, lines 25 through 31, "In a text to speech conversion system including dictionary means for storing dictionary entries for text and containing phonemic representations of the text, and phonemic representation to speech conversion means for transforming a phonemic representation into a voice signal," should read --In a text to speech conversion system including rule conversion means for converting a text to a phonemic representation thereof according to rules, dictionary means for storing dictionary entries for text not correctly convertible according to the rules and containing phonemic representations of the unconvertible text, and phonemic representation to speech conversion means for converting a phonemic representation into a voice signal,--.

Column 14, lines 42 through 48, "In a text to speech conversion system including dictionary means for storing dictionary entries for text and containing phonemic representations of the text, and phonemic representation to speech conversion means for transforming a phonemic representation into a voice signal," should read --In a text to speech conversion system including rule conversion means for converting a text to a phonemic representation thereof according to rules, dictionary means for storing dictionary entries for text not correctly convertible according to the rules and containing phonemic representations of the unconvertible text, and phonemic representation to speech conversion means for converting a phonemic representation into a voice signal,--.

UNITED STATES PATENT AND TRADEMARK OFFICE
CERTIFICATE OF CORRECTION

PATENT NO. : 4,831,654

DATED : May 16, 1989

INVENTOR(S) : Colleen R. Dick

It is certified that error appears in the above-identified patent and that said Letters Patent is hereby corrected as shown below:

Column 16, lines 46 through 52, "In a text to speech conversion system including dictionary means for storing dictionary entries for text and containing phonemic representations of the text, and phonemic representation to speech conversion means for transforming a phonemic representation into a voice signal," should read --In a text to speech conversion system including rule conversion means for converting a text to a phonemic representation thereof according to rules, dictionary means for storing dictionary entries for text not correctly convertible according to the rules and containing phonemic representations of the unconvertible text, and phonemic representation to speech conversion means for converting a phonemic representation into a voice signal,--.

Signed and Sealed this

Twenty-fourth Day of April, 1990

Attest:

HARRY F. MANBECK, JR.

*Attesting Officer*  *Commissioner of Patents and Trademarks*